(12) United States Patent
Haack

(10) Patent No.: US 8,651,421 B2
(45) Date of Patent: Feb. 18, 2014

(54) AIRCRAFT FUSELAGE STRUCTURE AND METHOD FOR ITS PRODUCTION

(75) Inventor: Cord Haack, Beckdorf (DE)

(73) Assignee: Airbus Operations GmbH, Hamburg (DE)

( * ) Notice: Subject to any disclaimer, the term of this patent is extended or adjusted under 35 U.S.C. 154(b) by 674 days.

(21) Appl. No.: 12/308,029

(22) PCT Filed: Jun. 5, 2007

(86) PCT No.: PCT/EP2007/055494
§ 371 (c)(1),
(2), (4) Date: May 19, 2009

(87) PCT Pub. No.: WO2007/141251
PCT Pub. Date: Dec. 13, 2007

(65) Prior Publication Data
US 2009/0314891 A1    Dec. 24, 2009

(30) Foreign Application Priority Data

Jun. 6, 2006  (DE) .......................... 10 2006 026 170

(51) Int. Cl.
*B64C 1/00* (2006.01)
(52) U.S. Cl.
USPC ......... 244/119; 244/131; 244/133; 29/525.01
(58) Field of Classification Search
USPC ..................... 244/119, 120, 117 R, 131, 133;
29/525.01, 525.06, 525.05, 525.13, 29/525, 29/525.11
See application file for complete search history.

(56) References Cited

U.S. PATENT DOCUMENTS

| | | | |
|---|---|---|---|
| 1,355,741 | A | 10/1920 | Gilmore et al. |
| 1,393,488 | A | 10/1921 | Black |
| 1,874,610 | A | 8/1932 | Payne |
| 1,885,406 | A | 11/1932 | Bechereau |
| 1,963,416 | A | 6/1934 | Minshall |

(Continued)

FOREIGN PATENT DOCUMENTS

| | | |
|---|---|---|
| DE | 4019744 | 1/1992 |
| DE | 10145272 | 4/2003 |

(Continued)

OTHER PUBLICATIONS

Attached English Translation of WO 2006/051235 A1.*

(Continued)

*Primary Examiner* — Joseph W Sanderson
(74) *Attorney, Agent, or Firm* — Jenkins, Wilson, Taylor & Hunt, P.A.

(57) ABSTRACT

An aircraft fuselage structure which is constructed from a plurality of shells which are joined together is disclosed. Each shell forms part of the aircraft fuselage and comprises a support structure and a skin which is arranged on the latter and outwardly seals the aircraft fuselage in a compression-proof manner. The aircraft fuselage structure comprises an upper and side shell and a lower shell, of which the lower shell has a radius which is essentially significantly larger than the radius of the upper and side shell. The upper and side shell and the lower shell are joined together at transition regions extending in the longitudinal direction of the aircraft. The support structure of the lower shell is designed in terms of its strength in such a manner that it is capable of absorbing the internal pressure loading of the lower shell without the use of a main crossmember.

13 Claims, 2 Drawing Sheets

(56) References Cited

U.S. PATENT DOCUMENTS

| | | | |
|---|---|---|---|
| 2,134,260 A | 10/1938 | Nickerson | |
| 2,259,624 A | 10/1941 | Dornier | |
| 2,263,365 A | 11/1941 | Nicolaus et al. | |
| 2,372,905 A | 4/1945 | McKinnie | |
| 2,407,480 A | 9/1946 | Dean | |
| 2,500,015 A | 3/1950 | Tweney et al. | |
| 2,778,586 A | 1/1957 | Nyerges et al. | |
| 2,925,050 A | 2/1960 | Candlin, Jr. et al | |
| 3,023,860 A | 3/1962 | Ellzey | |
| 3,155,348 A | 11/1964 | Ricard | |
| 3,405,893 A | 10/1968 | Rajau | |
| 3,677,502 A | 7/1972 | Tupolev et al. | |
| 3,955,781 A | 5/1976 | Tupolev et al. | |
| 4,310,132 A | 1/1982 | Frosch et al. | |
| 4,479,621 A | 10/1984 | Bergholz | |
| 4,622,517 A | 11/1986 | Arnaud et al. | |
| 4,646,993 A | 3/1987 | Baetke | |
| 5,024,399 A | 6/1991 | Barquet et al. | |
| 5,201,831 A | 4/1993 | Higgins et al. | |
| 5,223,067 A | 6/1993 | Hamamoto et al. | |
| 5,242,523 A * | 9/1993 | Willden et al. | 156/285 |
| 5,251,849 A | 10/1993 | Torres | |
| 5,429,326 A * | 7/1995 | Garesche et al. | 244/133 |
| 5,496,000 A | 3/1996 | Mueller | |
| 5,542,626 A * | 8/1996 | Beuck et al. | 244/107 |
| 5,577,688 A | 11/1996 | Sloan | |
| 5,586,391 A | 12/1996 | Micale | |
| 5,752,673 A | 5/1998 | Schliwa et al. | |
| 5,779,193 A | 7/1998 | Sloan | |
| 5,806,797 A | 9/1998 | Micale | |
| 5,897,079 A | 4/1999 | Specht et al. | |
| 5,975,183 A | 11/1999 | Reis et al. | |
| 6,114,050 A | 9/2000 | Westre et al. | |
| 6,158,690 A | 12/2000 | Wadey | |
| 6,182,926 B1 | 2/2001 | Moore | |
| 6,364,250 B1 | 4/2002 | Brinck et al. | |
| 6,415,510 B2 * | 7/2002 | Mertens et al. | 29/897.2 |
| 6,435,242 B1 | 8/2002 | Reis et al. | |
| 6,510,961 B1 | 1/2003 | Head et al. | |
| 6,511,570 B2 | 1/2003 | Matsui | |
| 6,595,467 B2 | 7/2003 | Schmidt | |
| 6,613,258 B1 | 9/2003 | Maison et al. | |
| 6,772,977 B2 | 8/2004 | Dees et al. | |
| 7,025,305 B2 | 4/2006 | Folkesson et al. | |
| 7,087,317 B2 * | 8/2006 | Ehrstrom et al. | 428/650 |
| 7,108,227 B2 | 9/2006 | Kunzel et al. | |
| 7,124,982 B2 | 10/2006 | Brofeldt | |
| 7,134,629 B2 | 11/2006 | Johnson et al. | |
| 7,159,822 B2 | 1/2007 | Grantham et al. | |
| 7,410,352 B2 | 8/2008 | Sarh | |
| 7,445,180 B2 | 11/2008 | Plude et al. | |
| 7,459,048 B2 | 12/2008 | Pham et al. | |
| 7,461,816 B2 | 12/2008 | Schwartz et al. | |
| 7,503,368 B2 | 3/2009 | Chapman et al. | |
| 7,527,222 B2 | 5/2009 | Biornstad et al. | |
| 7,621,482 B2 | 11/2009 | Sankrithi et al. | |
| 7,686,249 B2 | 3/2010 | Luttig et al. | |
| 7,716,835 B2 | 5/2010 | Johnson et al. | |
| 7,857,258 B2 * | 12/2010 | Normand et al. | 244/120 |
| 7,866,440 B2 * | 1/2011 | Douglas | 181/213 |
| 7,874,516 B2 * | 1/2011 | Cacciaguerra | 244/119 |
| 2002/0153454 A1 * | 10/2002 | Seidel | 244/119 |
| 2004/0195452 A1 | 10/2004 | Brofeldt | |
| 2005/0037188 A1 | 2/2005 | Ehrstrom et al. | |
| 2005/0236523 A1 | 10/2005 | Schwartz et al. | |
| 2005/0263645 A1 * | 12/2005 | Johnson et al. | 244/119 |
| 2006/0060705 A1 * | 3/2006 | Stulc et al. | 244/119 |
| 2006/0071125 A1 * | 4/2006 | Wood et al. | 244/119 |
| 2006/0108058 A1 | 5/2006 | Chapman et al. | |
| 2006/0192051 A1 * | 8/2006 | Novak et al. | 244/119 |
| 2006/0226287 A1 | 10/2006 | Grantham et al. | |
| 2006/0231682 A1 | 10/2006 | Sarh | |
| 2006/0237587 A1 | 10/2006 | Luttig et al. | |
| 2007/0176048 A1 | 8/2007 | Huber et al. | |
| 2007/0210211 A1 | 9/2007 | Grob | |
| 2008/0093503 A1 | 4/2008 | Cacciaguerra | |
| 2008/0105785 A1 * | 5/2008 | Griess et al. | 244/120 |
| 2008/0149768 A1 | 6/2008 | Sarh | |
| 2008/0156935 A1 * | 7/2008 | Alby et al. | 244/119 |
| 2008/0179460 A1 | 7/2008 | Rodriguez et al. | |
| 2008/0210820 A1 | 9/2008 | Kismarton et al. | |
| 2008/0223985 A1 | 9/2008 | Marsh et al. | |
| 2008/0230652 A1 | 9/2008 | Biornstad et al. | |
| 2008/0237442 A1 | 10/2008 | Sarh | |
| 2008/0246175 A1 | 10/2008 | Biornstad et al. | |
| 2008/0258007 A1 * | 10/2008 | Guard et al. | 244/119 |
| 2009/0020645 A1 | 1/2009 | Cacciaguerra | |
| 2009/0039208 A1 * | 2/2009 | Raeckers | 244/35 R |
| 2009/0101756 A1 * | 4/2009 | Cacciaguerra | 244/119 |
| 2009/0139641 A1 | 6/2009 | Chapman et al. | |
| 2009/0217529 A1 | 9/2009 | Cerezo et al. | |
| 2009/0250554 A1 | 10/2009 | Graeber et al. | |
| 2009/0294588 A1 | 12/2009 | Griess et al. | |
| 2009/0321569 A1 | 12/2009 | Schroeer et al. | |
| 2010/0025531 A1 | 2/2010 | Pahl | |
| 2010/0025532 A1 | 2/2010 | Herrmann et al. | |
| 2010/0044510 A1 | 2/2010 | Schroeer et al. | |
| 2010/0133380 A1 * | 6/2010 | Roebroeks et al. | 244/119 |
| 2010/0133382 A1 | 6/2010 | Pahl | |
| 2010/0155532 A1 | 6/2010 | Ariza Martin et al. | |
| 2010/0181426 A1 | 7/2010 | Haack | |
| 2010/0213315 A1 | 8/2010 | Marpinard | |
| 2010/0219294 A1 * | 9/2010 | Kismarton | 244/119 |
| 2010/0308165 A1 | 12/2010 | Markowski et al. | |
| 2010/0327113 A1 | 12/2010 | Marquez Lopez et al. | |
| 2011/0006159 A1 | 1/2011 | Herrmann et al. | |
| 2011/0011978 A1 | 1/2011 | Haack et al. | |
| 2011/0056066 A1 * | 3/2011 | Alvez | 29/525.06 |
| 2011/0073708 A1 * | 3/2011 | Biornstad et al. | 244/1 A |

FOREIGN PATENT DOCUMENTS

| | | |
|---|---|---|
| DE | 10145276 | 7/2003 |
| DE | 10314039 | 10/2004 |
| DE | 102004056286 | 5/2006 |
| DE | 102005023886 | 12/2006 |
| EP | 1149687 | 10/2001 |
| EP | 1731419 | 12/2006 |
| ES | 2112711 | 4/1998 |
| FR | 1345076 | 12/1963 |
| FR | 2766407 | 1/1999 |
| GB | 159 351 | 3/1921 |
| GB | 958883 | 5/1964 |
| GB | 2196922 | 5/1988 |
| JP | 54-031280 | 10/1979 |
| JP | 58-078895 | 5/1983 |
| JP | 59-176669 | 10/1984 |
| JP | 06-298186 | 10/1994 |
| JP | 2001-310798 | 11/2001 |
| JP | 2008-519730 | 6/2008 |
| RU | 2157757 | 10/2000 |
| RU | 2244660 | 1/2005 |
| RU | 2271304 | 3/2006 |
| RU | 2435703 | 7/2010 |
| WO | WO 96/10477 | 4/1996 |
| WO | WO 2005012085 | 2/2005 |
| WO | WO 2005084152 | 9/2005 |
| WO | WO 2005/121627 | 12/2005 |
| WO | WO 2006001859 | 1/2006 |
| WO | WO 2006051235 | 5/2006 |
| WO | WO 2007141251 | 12/2007 |
| WO | WO 2007141268 | 12/2007 |
| WO | WO 2007141291 | 12/2007 |

OTHER PUBLICATIONS

Notification of Transmittal of the International Search Report and the Written Opinion of the International Searching Authority, or the Declaration for International Application No. PCT/EP2007/055556 (Sep. 3, 2007).

German Office Action dated Sep. 25, 2007 corresponding to German Patent Application No. 10 2006 026 169.0-22.

(56) References Cited

OTHER PUBLICATIONS

German Office Action dated Sep. 25, 2007 corresponding to German Patent Application No. 10 2006 026 170.4-22.
Notification of Transmittal of The International Search Report and The Written Opinion of the International Searching Authority, or the Declaration for International Application No. PCT/EP2007/055519 (Oct. 22, 2007).
German Office Action dated Oct. 30, 2007 corresponding to German Patent Application No. 10 2006 026 168.2-22.
Notification of Transmittal of The International Search Report and The Written Opinion of the International Searching Authority, or the Declaration for International Application No. PCT/EP2007/055494 (Nov. 13, 2008).
Final Office Action for U.S. Appl. No. 12/227,669 dated Nov. 21, 2011.
Non-final Office Action for U.S. Appl. No. 12/227,669 dated Feb. 28, 2012.
Non-final Office Action for U.S. Appl. No. 12/227,669 dated Jun. 21, 2011.
Non-final Office Action for U.S. Appl. No. 12/308,004 dated Sep. 9, 2011.
Advisory Action for U.S. Appl. No. 12/308,004 dated Jul. 27, 2012.
Final Office Action for U.S. Appl. No. 12/227,669 dated Aug. 2, 2012
Russian Grant Decision for Appl. No. 2009-145997/05(065625) dated Aug. 20, 2012.
Japanese Office Action for Appl. No. 2009-513670 dated Apr. 27, 2012.
Non-Final Office Action for U.S. Appl. No. 12/308,004 dated Oct. 15, 2012.
Non-Final Office Action for U.S. Appl. No. 12/227,669 dated Nov. 15, 2012.
Chinese Office Action for CN 200780018303.4 dated Mar. 18, 2013.
Final Office Action for U.S. Appl. No. 12/308,004 dated Apr. 26, 2013.
Notice of Allowance for U.S. Appl. No. 12/227,669 dated May 15, 2013.
Chinese Office Action for Application No. 200780015659.2 dated Jul. 14, 2010.
Russian Notice of Grant for Appl. No. 2008-151379-11 dated Jun. 1, 2011.
Advisory Action for U.S. Appl. No. 12/308,004 dated Jul. 16, 2013.
Notice of Allowance for U.S. Appl. No. 12/308,004 dated Aug. 19, 2013.
Final Office Action for U.S. Appl. No. 12/308,004 dated Apr. 4, 2012.

* cited by examiner

AIRCRAFT FUSELAGE STRUCTURE AND METHOD FOR ITS PRODUCTION

The invention relates to an aircraft fuselage structure and to a method for the production of an aircraft fuselage structure.

BACKGROUND OF THE INVENTION

Fuselage structures of commercial aircraft nowadays are typically produced from a plurality of shells of uniform skin materials in approximately circular cross sections and usually have a transverse stiffening means in the form of a crossmember (main crossmember) in the vicinity of the vertical centre of the fuselage. The overall number of crossmembers acts at the same time as a supporting grid system for the passenger cabin. The approximately circular or oval cross section serves to stabilize the fuselage against the internal pressure of the cabin. The most modern type of fuselage skins are produced using carbon-fibre composite materials, and therefore a uniform material is used over the circumference of the fuselage. The transverse stiffening by means of the crossmembers mentioned typically divides the fuselage, which is essentially circular in cross section, into two sections, thereby producing an upper deck and a lower deck.

It is an object of the invention to provide an aircraft fuselage structure and a method for the production of a structure of this type, with which an aircraft fuselage can be provided which manages without the spatial limitations caused by the conventional type of crossmember and at the same time has a high degree of stability.

BRIEF DESCRIPTION OF THE INVENTION

An aircraft fuselage structure according to the present invention is constructed from a plurality of shells which are joined together, each form part of the aircraft fuselage and comprise a support structure and a skin which is arranged on the support structure and outwardly seals the aircraft fuselage in a compression-proof manner, wherein the aircraft fuselage structure comprises an upper and side shell and a lower shell, of which the lower shell has a radius which is essentially significantly larger than the radius of the upper and side shell, the upper and side shell and the lower shell being joined together at transition regions extending in the longitudinal direction of the aircraft, and in that the support structure of the lower shell is designed in terms of its strength in such a manner that it is capable of absorbing the internal pressure loading of the lower shell without the use of a main crossmember.

According to a preferred embodiment the radius, averaged over the circumference, of the lower shell is more than 1.2 times the radius, averaged over the circumference, of the upper and side shell.

According to a preferred embodiment the radius, averaged over the circumference, of the lower shell is more than 1.5 times the radius, averaged over the circumference, of the upper and side shell.

According to a preferred embodiment the radius, averaged over the circumference, of the lower shell is more than twice the radius, averaged over the circumference, of the upper and side shell.

According to a preferred embodiment the upper and side shell has an essentially constant radius.

According to a preferred embodiment the lower shell has a central region which extends from the centre of the aircraft to both sides and has an essentially constant radius and has a smaller radius at the sides in the vicinity of the transition regions, so that the lower shell merges smoothly into the upper and side shell.

According to a preferred embodiment the lower shell is produced in one piece with regard to the circumferential direction.

According to a preferred embodiment the upper and side shell is produced in a plurality of partial shells with regard to the circumferential direction.

According to a preferred embodiment the lower shell is produced from light metal components.

According to a preferred embodiment the upper and side shell is produced from fibre-reinforced components.

According to a preferred embodiment the support structure of the lower shell contains frames, which run in the circumferential direction and have a substantially greater height than corresponding frames of the upper and side shell.

According to a preferred embodiment the frames of the lower shell, which run in the circumferential direction, have a height which increases towards the centre.

According to a preferred embodiment the frames of the lower shell have reinforced internal chords.

According to a preferred embodiment the frames of the lower shell have reinforcing ribs, which run radially.

According to a preferred embodiment the upper and side shell comprises a support structure with frames and stringers produced from fibre-reinforced material, and a skin produced from fibre-reinforced material.

According to a preferred embodiment the skin of the upper and side shell is produced from carbon-fibre-reinforced plastic material.

According to a preferred embodiment the skin of the upper and side shell is produced from aluminium and glass-fibre composite material.

According to a preferred embodiment the rivet connection contains titanium rivets.

DETAILED DESCRIPTION OF THE INVENTION

Exemplary embodiments of the invention are explained below with reference to the drawing, in which.

Figure 3:
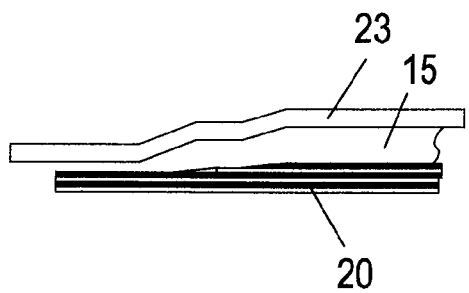
Figure 4:
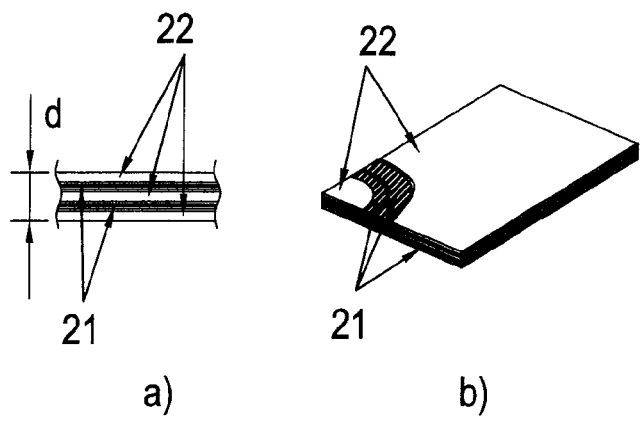

FIG. 3 and FIGS. 4a) and b) each show cross-sectional illustrations in order to explain the construction of connecting tabs which serve, according to exemplary embodiments of the invention, to connect the skin of an upper and side shell and of a lower shell according to exemplary embodiments of the invention.

Figure 1:
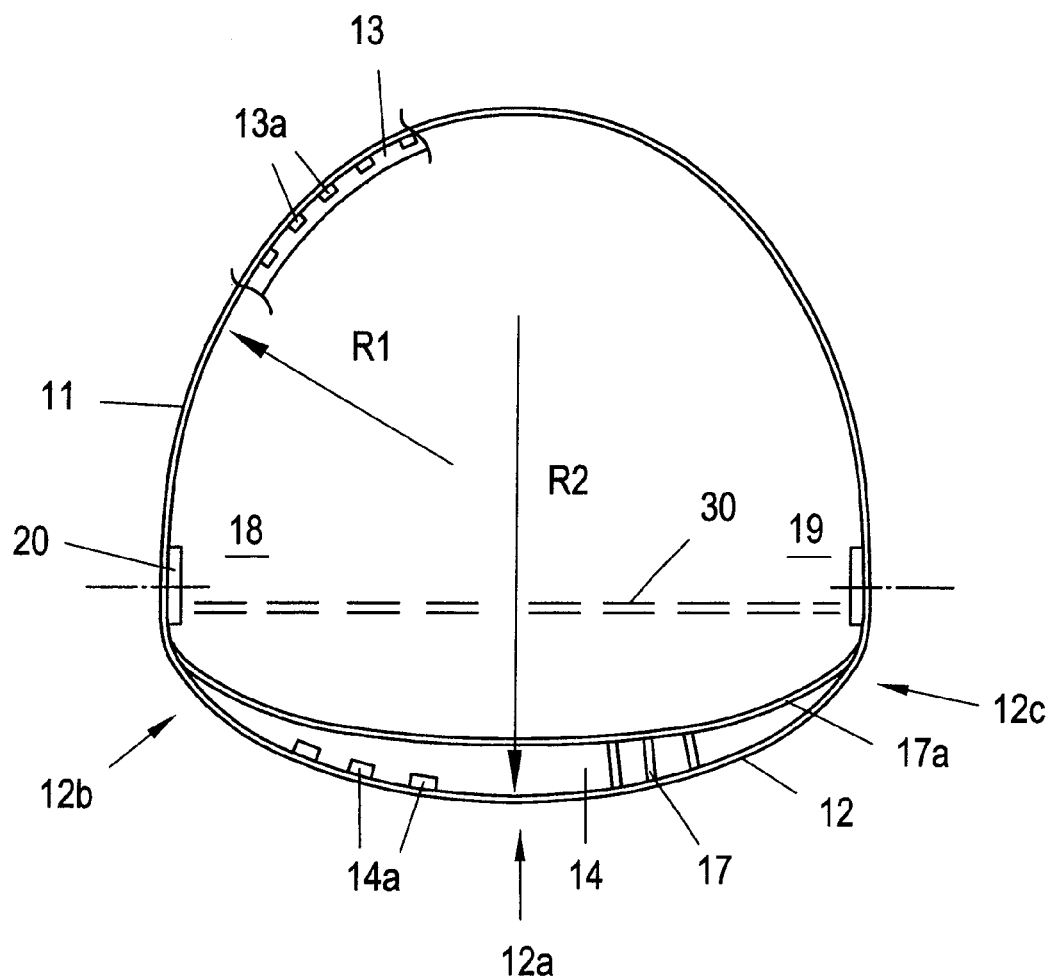
FIG. 1 shows a highly schematized cross-sectional view of an aircraft fuselage structure as can be illustrated by an exemplary embodiment of the invention and as can be produced according to an exemplary embodiment of the method according to the invention.

FIG. 1 shows, in highly schematized form, a cross-sectional illustration of an aircraft fuselage 10 which is formed by an upper and side shell 11 and a lower shell 12. The upper and side shell 11 has a support structure which is formed by respective frames 13 and stringers 13a, of which only a few are illustrated partially and in schematized form in FIG. 1, and the lower shell 12 has a support structure which is formed by frames 14 and stringers 14a which are likewise illustrated only in schematized form. A respective skin 15 and 16 outwardly sealing the aircraft fuselage 10 in a compression-proof manner is arranged on the support structures 13, 13a and 14, 14a of upper and side shell 11 and of lower shell 12.

As shown in FIG. 1, the lower shell 12 has a radius R2 which is essentially significantly larger than the radius R1 of the upper and side shell 11. The upper and side shell 11 and the lower shell 12 are joined together on both sides of the fuselage 10 at transition regions 18, 19 which extend in the longitudinal direction of the aircraft. The support structure 14, 14a of the lower shell 12 is designed in terms of its strength in such a manner that it is capable of absorbing the internal pressure loading of the lower shell 12 without the aircraft fuselage needing to be stiffened in the transverse direction in the manner of a conventional crossmember (main crossmember).

The radius R2, averaged over the circumference, of the lower shell 2 can be more than 1.2 times, more than 1.5 times or more than twice the radius R1 averaged over the circumference, of the upper and side shell 11 without the abovementioned values being intended to be understood as comprising a limitation.

The upper and side shell 11 can have an essentially constant radius R1.

The lower shell 12 can have a central region 12a which extends from the centre of the aircraft to both sides and has an essentially constant radius R2 and have a smaller radius at the sides 12b, 12c in the vicinity of the transition regions 18, 19, at which the upper and side shell 11 merges into the lower shell 12, and therefore the lower shell 12 merges smoothly into the upper and side shell 11. In this case, the lower shell 12 can have, in the central region 12a, a radius R2 which is more than 1.3 times, more than twice or more than 2.5 times the radius R1 of the upper and side shell 11 without the abovementioned values being intended to be understood as comprising a limitation.

The lower shell 12 can be produced in one piece with regard to the circumferential direction. However, it may, if appropriate, also be produced in a plurality of pieces with regard to the abovementioned direction.

The upper and side shell 11 can be produced in a plurality of partial shells with regard to the circumferential direction. However, if appropriate, it could also be produced in a single shell in the abovementioned direction.

The expression "upper and side shell" for the upper part 11 of the aircraft fuselage structure is to be understood here in such a manner that this upper part 11 also comprises lateral regions of the fuselage in addition to upper regions thereof, while the lower part 12 of the aircraft fuselage, which part is referred to as the lower shell, predominantly only comprises lower regions of the fuselage structure. Since, as FIG. 1 reveals, both the upper part 11 and the lower part 12, however, each also comprise lateral regions of the aircraft fuselage, this manner of designation is not to be understood within a relatively narrow context and as being limiting, and it is meant that the part 11 primarily takes up the upper region of the fuselage and its sides, and the part 12 primarily takes up the lower region of the fuselage.

The lower shell 12 can be produced from light metal components. In principle, both the upper and side shell 11 and the lower shell 12 can be produced either from light metal components in a conventional construction or from fibre-reinforced components in a modern construction.

In the exemplary embodiment illustrated, the aircraft fuselage structure is produced in a hybrid construction, in which the lower shell 12 is produced from light metal components and the upper and side shell 11 is produced from fibre-reinforced components. The support structure of the lower shell 12 contains frames 14 (transverse frames), which run in the circumferential direction and, as is apparent from FIG. 1, have a substantially greater height than corresponding frames of the upper and side shell 11. In particular, the frames 14 of the lower shell 12, which run in the circumferential direction, have a height which increases from the side towards the centre, in a manner corresponding to the load profile in the lower shell 12. The greater height of the frames 14 of the lower shell 12 is required in order to absorb the internal pressure loading occurring because of the greater radius R2. However, the greater frame height is also advantageous insofar as it can be used at the same time as a protective measure for the lower shell 12 when it is subjected to a hard stress and as a supporting structure for the cabin. A deck 30 can be arranged on the frames 14 of the lower shell 12, the deck 30 only being indicated by dashed lines in FIG. 1 and not being the subject matter of this application.

The frames 14 of the lower shell 12 can have reinforced internal chords 17a and reinforcing ribs 17, which run radially and each serve to produce the required strength of the frames 14.

In the exemplary embodiment described here, the upper and side shell 11 comprises a support structure with frames 13 and stringers 13a produced from fibre-reinforced material and a skin 15 produced from fibre-reinforced material. The skin 15 of the upper and side shell 11 can be produced from carbon-fibre-reinforced plastic material or else from an aluminium and fibre composite material, in particular an aluminium and glass-fibre composite material.

Figure 2:
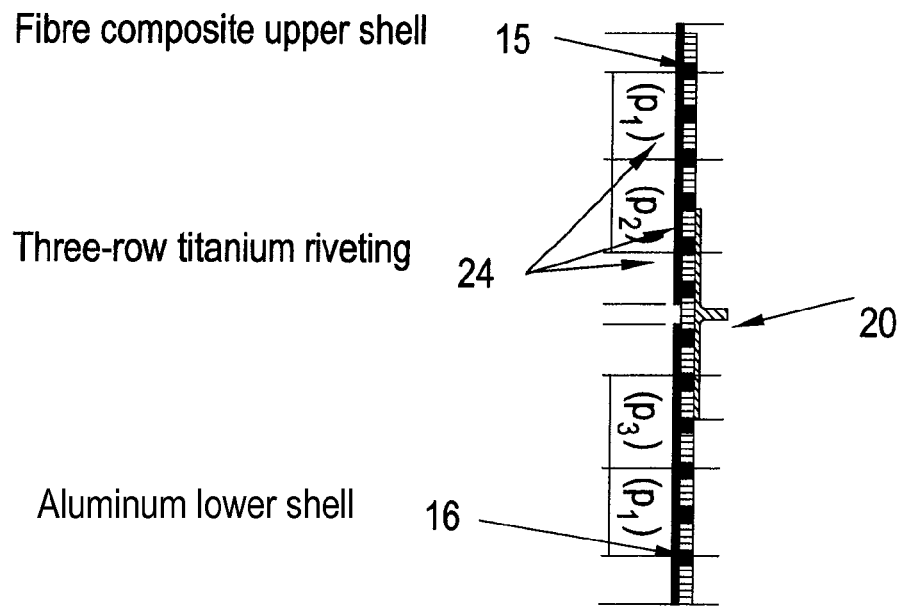
FIG. 2 shows a sectional view through the skin of an aircraft fuselage structure according to an exemplary embodiment of the invention, said view illustrating the connection of the skin of an upper and side shell and of a lower shell of the aircraft fuselage structure according to the invention.

As FIG. 2 shows, the upper and side shell 11 and the lower shell 12 are connected in the transition region 18, 19 by means of a "glass-fibre and aluminium composite tab" 20 ("GLARE") which comprises a laminate in which layers 21 of a textile fibre material, in particular glass-fibre material, and light metal layers 22, in particular layers of an aluminium alloy, are arranged in an alternating manner. A lamination 23 is provided on that side of the skin of the shells 11, 12 which is opposite the glass-fibre and aluminium composite tab 20. Composite tabs of this type serve to compensate for different thermal coefficients of expansion of light metal alloys and fibre-reinforced plastics. Their composite structure enables them to ensure adaptation of the different coefficients of expansion of the materials involved.

The connection between upper and side shell 11, on the one hand, and lower shell 12, on the other hand, is produced by a multi-row rivet connection 24, 25, in particular a three-row rivet connection in each case. The rivet connection 24, 25 can contain titanium rivets or titanium bolts.

The construction of the connection between upper and side shell 11, on the one hand, and lower shell 12, on the other hand, is illustrated according to a further exemplary embodiment in FIG. 3. A glass-fibre and aluminium composite tab 20 is again arranged on one side of the connection and a lamination 23 on the other side.

FIGS. 4a) and b) show, in a schematized cross-sectional illustration and, respectively, in a schematized, perspective, partially broken open illustration, the construction of the abovementioned glass-fibre and aluminium composite tab 20 with glass-fibre layers 21 and light metal layers 22 arranged in an alternating manner.

According to an exemplary embodiment of the invention, the production of an aircraft fuselage structure according to the invention, as has been described above, takes place by production of an upper and side shell 11 from a fibre composite material, including the support structure 13, 13a of said shell, which can be formed by stringers 13a and frames 13, by means of an adhesive bonding process; production of a lower shell 12 from aluminium or light metal material, including its support structure 14, 14a, which can be formed in turn by stringers 14a and frames 14; connection of the upper and side shell 11 to a glass-fibre and aluminium composite tab 20 (this firstly, in order to be able to better compensate for fibre composite tolerances); insertion of the upper and side shell 11 onto the lower shell 12 into the glass-fibre and aluminium composite tab connected to the upper and side shell 11. The riveting of the glass-fibre composite tab 20 to the lower shell 12 can take place by means of rivets, in particular by means of titanium bolts. All of the fuselage segments are joined in the manner described, and then the fuselage segments are joined to form the overall fuselage by locking of the transverse joints in turn by means of rivets, in particular titanium rivets or titanium bolts.

The hybrid construction described is advantageous insofar as weight-saving fibre composite materials are used for the upper and side shell 11 where the loading due to internal pressure is smaller on account of the fuselage shape with the smaller radius R1 and a risk due to external effects is lower, while the use of light metal or aluminium material for the lower shell 12 is advantageous with regard to a higher capability of resistance to external effects, is relatively simple to check and repair and is advantageous with regard to electroplating properties and electric shielding as a discharge measure with respect to electric charging of the upper shell 11 and as shielding of lines and electronic devices from the environment.

LIST OF REFERENCE NUMBERS

10 Aircraft fuselage
11 Upper and side shell
12 Lower shell
12a Central region
13 Frame
13a Stringer
14 Frame
14a Stringer
15 Skin
16 Skin
17 Reinforcing ribs
17a Internal chord
18 Transition region
19 Transition region
20 Glass-fibre and aluminium composite tab
21 Glass-fibre layers
22 Light metal layers
23 Lamination
24 Rivet connection
25 Rivet connection
30 Deck

The invention claimed is:

1. An aircraft fuselage structure which is constructed from a plurality of shells which are joined together,
each shell forming part of the aircraft fuselage and comprising:
a support structure, and
a skin which is arranged on the support structure and outwardly seals the aircraft fuselage in a compression-proof manner,
wherein the plurality of shells of the aircraft fuselage structure comprises:
an upper and side shell, and
a lower shell,
of which the lower shell has a radius which is, averaged over the circumference, more than 1.2 times the radius, averaged over the circumference, of the upper and side shell,
the upper and side shell and the lower shell being joined together at transition regions extending in the longitudinal direction of the aircraft,
wherein the support structure of the lower shell is designed in terms of the strength of the support structure in such a manner that the support structure is capable of absorbing the internal pressure loading of the lower shell without the use of a main crossmember,
wherein, the aircraft fuselage structure is produced in a hybrid construction with the lower shell being produced from light metal components and the upper and side shell being produced from fiber-reinforced components;
wherein the upper and side shell and the lower shell are connected in the transition regions by a glass-fiber and aluminum composite tab with glass-fiber layers and light metal layers arranged in an alternating manner in a laminate, and
wherein the lower shell has a central region which extends from the center of the aircraft to both sides and has a constant radius and has a smaller radius at the sides in the vicinity of the transition regions, so that the lower shell merges smoothly into the upper and side shell.

2. The aircraft fuselage structure according to claim 1, wherein the radius in the central region of the lower shell is more than 1.3 times the radius of the upper and side shell.

3. The aircraft fuselage structure according to claim 1, wherein the radius in the central region of the lower shell is more than twice the radius of the upper and side shell.

4. The aircraft fuselage structure according to claim 1, wherein the radius in the central region of the lower shell is more than 2.5 times the radius of the upper and side shell.

5. The aircraft fuselage structure according to claim 1, wherein a lamination is provided on the glass-fiber and aluminum composite tab.

6. The aircraft fuselage structure according to claim 1 or 5, wherein the connection between the upper and side shell and the lower shell is produced by a multi-row rivet connection.

7. A method for the production of an aircraft fuselage structure which is constructed from a plurality of shells which are joined together,
each shell forming part of the aircraft fuselage and comprising:
a support structure, and
a skin which is arranged on the support structure and outwardly seals the aircraft fuselage in a compression-proof manner,
the plurality of shells of the aircraft fuselage structure comprising:
an upper and side shell, and
a lower shell,
of which the lower shell has a radius which is, averaged over the circumference, more than 1.2 times the radius, averaged over the circumference of the upper and side shell,
the upper and side shell and the lower shell being joined together at transition regions extending in the longitudinal direction of the aircraft, and
the support structure of the lower shell being designed in terms of the strength of the support structure in such a manner that the support structure is capable of absorbing the internal pressure loading of the lower shell without the use of a main crossmember, wherein production of the upper and side shell from a fiber composite material, including the support structure;

production of the lower shell from an aluminum material, including the support structure;

connection of the upper and side shell to a glass-fiber and aluminum composite tab which contains glass-fiber layers and light metal layers arranged in an alternating manner in a laminate;

fitting the upper and side shell to the lower shell, including the glass-fiber and aluminum composite tab which protrudes on the upper and side shell; and connection of the glass-fiber and aluminum composite tab to the lower shell.

8. The method according to claim 7, wherein the production of the upper and side shell from the fiber composite material includes a process of adhesively bonding stringers and frames contained in the support structure and the skin.

9. The method according to claim 7 or 8, wherein the production of the lower shell from aluminum material comprises production of stringers and frames and skin.

10. The method according to claim 7 or 8, wherein the connection of the glass-fiber and aluminum composite tab to the upper and side shell and to the lower shell comprises riveting by means of titanium bolts.

11. The method according to one of claim 7 or 8, wherein the connection of the upper and side shell and the lower shell comprises the provision of a lamination on the glass-fiber and aluminum composite tab.

12. The method according to one of claim 7 or 8, wherein the method comprises the production of all of the fuselage segments of the fuselage and the joining and connection of the fuselage segments to form the overall fuselage.

13. The method according to one of claim 7 or 8, wherein the method comprises locking of transverse joints between fuselage sections by means of titanium bolts.

* * * * *